(12) United States Patent
Todd et al.

(10) Patent No.: US 6,822,426 B1
(45) Date of Patent: Nov. 23, 2004

(54) REGULATOR WITH FEEDBACK VOLTAGE AND CURRENT SIGNAL SUMMING INTO CONTROLLER

(75) Inventors: Philip C. Todd, Long Beach, CA (US); Joe Anthony Ortiz, Garden Grove, CA (US); Stephen John Hulsey, Los Angeles, CA (US); Bruce R. Baker, Riverside, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/456,716

(22) Filed: Jun. 6, 2003

(51) Int. Cl.[7] .............................................. G05F 1/565
(52) U.S. Cl. ........................ 323/275; 323/274; 323/269
(58) Field of Search ................................ 323/275, 274, 323/269, 277, 280

(56) References Cited

U.S. PATENT DOCUMENTS 3,902,111 A * 8/1975 Pfisterer, Jr. ................ 323/280
4,704,572 A * 11/1987 Melbert ....................... 323/275
5,041,777 A * 8/1991 Riedger ....................... 323/277
5,408,173 A * 4/1995 Knapp ......................... 323/285

* cited by examiner

*Primary Examiner*—Shawn Riley
(74) *Attorney, Agent, or Firm*—Ingrassia Fisher & Lorenz, P.C.

(57) ABSTRACT

A current control circuit forces current sharing among paralleled power converters. Each power converter has an associated current control circuit, which includes a current amplifier and a coupling circuit. The current amplifier outputs a feedback signal to a voltage regulation error amplifier when the power converter output current falls below a predetermined threshold level. The error amplifier causes an increase in the power converter output voltage, forcing an increase in output current. Therefore, each power converter in a paralleled arrangement is regulated to provide a minimum level of output current, based on a predetermined threshold value.

20 Claims, 3 Drawing Sheets

REGULATOR WITH FEEDBACK VOLTAGE AND CURRENT SIGNAL SUMMING INTO CONTROLLER

FIELD OF THE INVENTION

The present invention generally relates to power converters/power supplies, and more particularly relates to the sharing of load current between paralleled power converters/power supplies.

BACKGROUND OF THE INVENTION

Power conversion circuits (hereinafter referred to as power supplies or power converters) are typically circuits designed to convert one direct current (DC) supply voltage level to a different DC supply voltage level, as may be required for a particular application. One application of a power conversion circuit, for example, is to supply DC power to a space satellite electronic communication system. In this type of application, where component size and weight are important factors, an improvement in the operating efficiency of a DC power source is a desirable objective, since an increase in efficiency may enable a reduction in the size and weight of the power source.

Two or more power converters are frequently connected in parallel when supplying power to a system due to load capacity considerations and/or packaging constraints. In addition, parallel combinations of power converters can provide a desired level of redundancy for high reliability applications such as power supplies in space satellites, where repair of a damaged power converter can be prohibitively expensive if not impossible.

Ideally, paralleled power converters are designed to share the current provided to the load equally. That is, it is desirable for each converter in a parallel power converter circuit to provide an approximately equal proportion of the total current provided to the load. In many practical applications, however, paralleled power converters frequently experience variations in their respective output voltages due to factors such as temperature coefficient, aging and output impedance differences, thereby making exact current matching between parallel converters relatively difficult to achieve.

The fraction of total load current supplied by each individual paralleled power converter is generally a function of (i.e. is dependent at least in part upon) the differences in output voltage and output impedance of the two (or more) power converters. Thus, when power converters are connected in parallel, the power converter having the higher output voltage typically supplies more current that then converter with a lower output voltage. In an extreme case, the converter with the higher output voltage may provide most, or possibly all, of the output load current. This unbalanced condition is made even worse if the power converter with the higher output voltage also has the lower output impedance of the two (or more) converters.

The unequal sharing of load current by paralleled power converters may degrade the performance and reliability of a power system. This problem is of particular concern when the power converters use synchronous rectification due to the inherent feedback properties of these circuits. In certain situations, it may be possible for a power converter having a lower output voltage than another converter to sink current from the other power converters, thereby further degrading the efficiency of the power circuit. This sink current is typically dependent upon the voltage difference between power converters, and by their output impedances.

In the absence of forced current sharing, power converters in a paralleled arrangement are often configured to operate in a current limit mode that prohibits the output current from exceeding a particular value. In such cases, a converter at a higher output voltage and/or lower output impedance frequently provides the maximum allowed current, with converters with lower output voltages and/or higher output impedances idling with relatively little or no output current, or worse, sinking current from the heavily-loaded power converters. The efficiency of the current-limited power converters is therefore relatively low due to $I^2R$ power loss, and the efficiency of the idling (sinking) power converters is effectively zero, since the sinking converter is delivering no power, but is consuming power. Effective current sharing will therefore generally improve the total efficiency of a paralleled power converter system.

Numerous techniques have been used in the past to implement current sharing. One current sharing technique involves manually adjusting the output voltages of paralleled power converters to be equal to each other in an effort to equalize current sharing. Current equalization is typically achieved at only one operating point and temperature however, unless the output impedances and temperature coefficients of the power converters are matched. Even in such cases, the matching can only be assured at the beginning of circuit life, and frequently degrades with time.

Another current sharing technique involves adjusting (e.g. adding) output impedances to force current sharing through voltage droop. This technique may be effective if output voltages are matched, but often results in a loss in efficiency.

Another current sharing technique forces current sharing by electronically adding an output voltage droop as a function of output current, by linearly adjusting the output voltage downward as a function of current. A disadvantage of this method is that the resultant excessive output voltage droop typically degrades the output voltage regulation.

Another current sharing method utilizes active load current sensing and correction, with active circuitry coupling each paralleled power converter with each other paralleled power converter. This method may be effective, but typically requires interconnecting signals between power converters, thereby complicating the circuit implementation, and making the reliability of the system dependent on the reliability of the interconnection.

Yet another current sharing technique utilizes a master and slave configuration, which generally requires two different configurations of power converters. This method also typically requires the interconnection of signals between power converters, making the reliability of the system dependent on the reliability of the interconnection.

Still another current sharing technique allows the converters to operate in current limit mode, as briefly mentioned above. In this case, as output current of a power converter reaches a current limit set point, the current limit control loop typically overrides the voltage regulation loop to prevent the current from exceeding the limit. As a result, the output current is regulated and the voltage regulation loop is no longer in exclusive control of the output. The power converter effectively becomes a high output impedance current source, thereby requiring load current and load transients to be absorbed by the remainder of the paralleled power converters. This arrangement also results in an increase in output impedance to the system.

Accordingly, it is desirable to provide an efficient current balancing circuit for paralleled power converters where output voltage regulation mode is maintained in conjunction with low output impedance. In addition, it is desirable to provide a current balancing circuit that eliminates the need for cross-coupling of current sense or current control signals between paralleled power converters. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A current control circuit that forces current sharing among paralleled power converters includes a current amplifier biased with a reference voltage and having an input to a voltage error amplifier. The error amplifier maintains voltage regulation of a power converter via a voltage feedback signal from the output of the power converter. The error amplifier receives a signal from the current amplifier, depending on the biasing characteristics of a coupling circuit between the current amplifier output and the error amplifier input. The output current of the voltage regulated power converter is sensed, and a proportional signal is fed back to the current amplifier. When the sensed output current falls below a threshold level, as determined by the sensing circuit characteristics and the current amplifier reference voltage, the output signal of the current amplifier falls to a level that forward biases the coupling circuit. This enables the current amplifier output signal, via the coupling circuit, to influence the error amplifier input, such that the error amplifier output increases, causing an increase in the power converter output voltage, thus forcing an increase in output current.

In a paralleled arrangement of two or more power converters, an individual current control circuit, as described above, is associated with each of the paralleled power converters. As a result, each power converter is independently regulated to provide a minimum level of output current, based on a predetermined threshold value. In addition, the output voltage regulation mode is maintained, in conjunction with low output impedance. Moreover, cross-coupling of current sense or current control signals between paralleled power converters is not required.

BRIEF DESCRIPTION OF THE DRAWINGS

The present invention will hereinafter be described in conjunction with the following drawing figures, wherein like numerals denote like elements.

DETAILED DESCRIPTION OF EXEMPLARY EMBODIMENTS

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
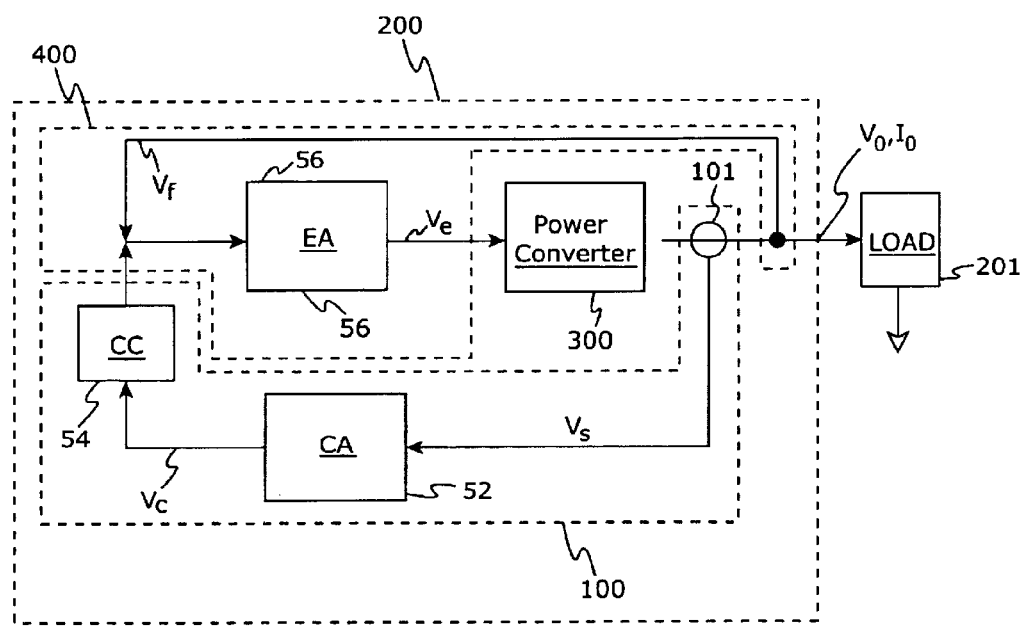
FIG. 1 is a simplified block diagram of an exemplary current feedback control circuit for a power converter.

A simplified block diagram of an exemplary embodiment of a current control circuit for a voltage regulated power supply is shown in FIG. 1. This embodiment includes a power supply 200 connected to a load 201, with an associated voltage regulation control loop circuit 400 and current control circuit 100. The exemplary configuration of current control circuit 100 suitably includes a current sensing circuit 101, a current amplifier circuit (CA) 52, and a coupling circuit (CC) 54. Current sensing circuit 101 is illustratively connected between the output of a power converter 300 and an input of current amplifier circuit 52 for clarity, but current sensing could be internal to the power converter without detracting from the described invention, or limiting the described invention. Coupling circuit 54 is appropriately connected between an output of current amplifier circuit 52 to an input of an error amplifier circuit 56, which controls power converter 300. In operation, output current provided by the power converter is sensed by circuit 101 and compared to a reference signal at current amplifier circuit 52. If the output current is less than a predetermined threshold value, the coupling circuit appropriately sinks feedback current applied to the error amplifier to appropriately adjust the input signal $V_e$ applied to power converter 300.

In an exemplary embodiment, power supply 200 is a regulated DC-to-DC power supply, load 201 generally represents a system, network, or power distribution circuit, current amplifier circuit 52 is typically a differential operational amplifier, coupling circuit CC 54 is generally a type of resistor/diode combination, and the voltage error amplifier circuit EA 56 is typically an operational amplifier configured as an integrator. However, specific circuit implementation is not limited by the described embodiment.

Several basic functions of the exemplary embodiment shown in FIG. 1 include regulating an output voltage $V_o$ at the output of power supply 200 across load 201, and maintaining a desired minimum level of output current $I_o$ through load 201, as described below. The voltage regulation circuitry 400 for power supply 200 operates through the use of error amplifier circuit 56. Signal $V_f$ feeds variations in output voltage $V_0$ back to error amplifier circuit 56 such that error amplifier circuit 56 generates an output error voltage $V_c$. This error voltage ($V_c$) is suitably connected to power converter 300 to compensate for variations in output voltage V.

The minimum level of output current I, is illustratively maintained through the action of current sensor 101 in conjunction with current amplifier circuit 52 and coupling circuit 54. In this exemplary embodiment, current sensor 101 generates a sensing signal VS that is representative of the level of output current $I_0$. Current amplifier circuit 52 is illustratively configured to generate an output signal $V_c$, which is related to the level of sensing signal $V_s$. At a predetermined minimum level of output current $I_o$, that is, when $I_o$ falls below the predetermined minimum level, sensing signal $V_s$ and current amplifier circuit 52 output voltage $V_c$ decrease correspondingly, pulling down the output signal level of coupling circuit 54. The output signal level of coupling circuit 54 is, illustratively, summed with the feedback signal $V_f$ at a common input to error amplifier circuit 56. Thus, a pull down of the output signal level of coupling circuit 54 also pulls down the error amplifier input signal, which, illustratively, causes an increase in the level of output error voltage $V_c$. Output error voltage $V_e$ is suitably coupled to the power converter 300. Illustratively, an increase in error voltage $V_e$ influences power converter 300 to increase its output voltage $V_o$ across load 201. As a result, the power converter 300 output current $I_o$ will increase correspondingly to at least a level above the predetermined minimum level.

Figure 2:
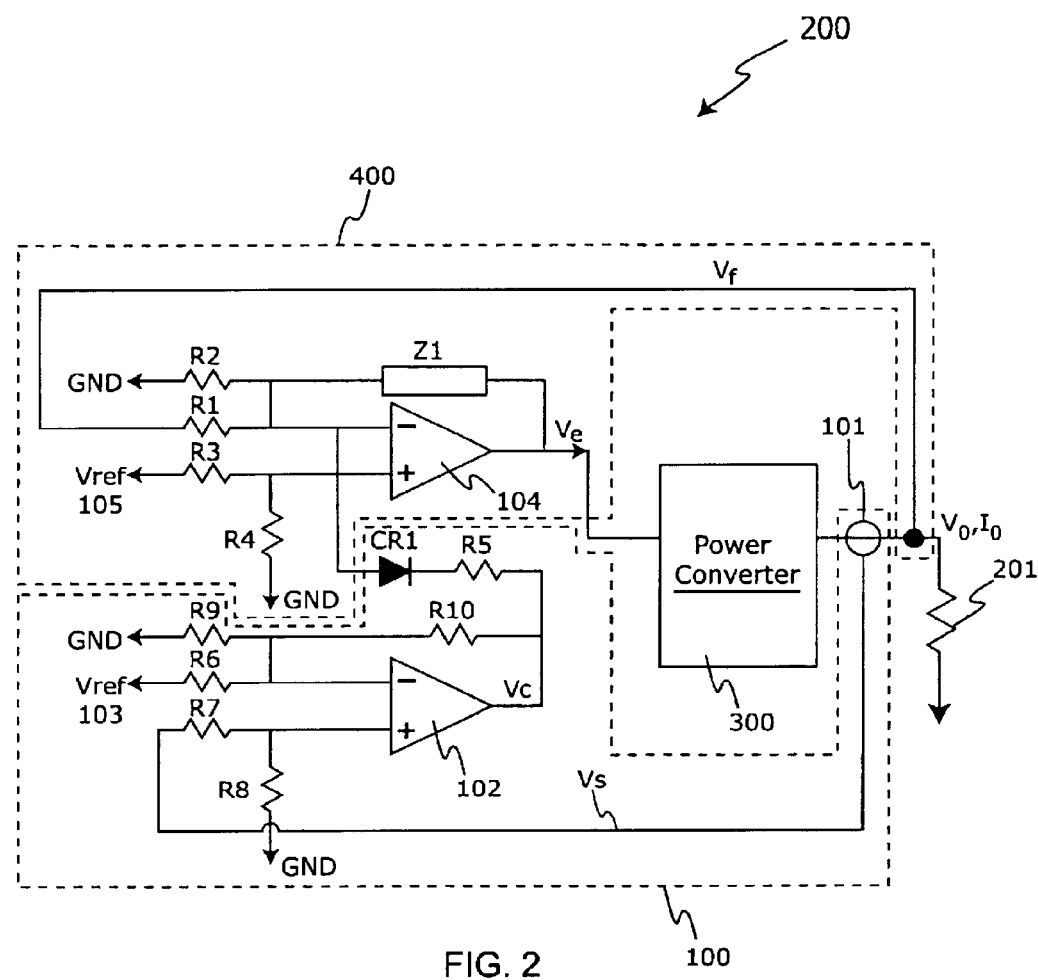
FIG. 2 is a schematic of an exemplary current feedback control circuit for a power converter.

A more detailed version of the exemplary embodiment of power supply 200 is represented schematically in FIG. 2. In accordance with this embodiment, a current feedback control circuit 100 is suitably coupled to a power converter 300 for the previously-stated dual purpose of regulating the output voltage $V_o$ and of maintaining at least a predetermined minimum level of output current $I_o$.

As shown in FIG. 2, a current sensing circuit 101 is illustratively coupled from the output of power converter 300 via a resistive network R7, R8 to the non-inverting input of a current amplifier 102, configured as a differential amplifier. Current sensor 101 may be a resistor, a Hall effect device, a current transformer/sense resistor, or any other current sensing circuit or device. Load return current may also be sensed, as well as power converter primary current.

A reference voltage 103 is illustratively coupled to the inverting input of current amplifier 102 via a resistive network R6, R9. A feedback resistor R10 is suitably coupled from the output of current amplifier 102 to its inverting input. An RC network may be substituted for R10 to provide for current loop compensation to ensure stable operation between paralleled power supplies.

The output of current amplifier 102 is illustratively connected to a coupling circuit, which is comprised, e.g., of a resistor R5 in series with a diode CR1. The output of the exemplary coupling circuit is connected to the inverting input of an error amplifier 104, configured as an integrating amplifier.

A voltage feedback signal $V_f$ is illustratively coupled from the output of power converter 300 to the inverting input of error amplifier 104 via a resistive network R1, R2. A feedback impedance $Z_i$ is illustratively connected from the output of error amplifier 104 to its inverting input. Impedance $Z_i$ is typically configured as an RC network, used to frequency compensate the control loop gain to ensure stable control loop operation.

A reference voltage 105 is illustratively coupled to the non-inverting input of error amplifier 104 via a resistive network R3, R4. The output of error amplifier 104 is suitably coupled to the regulating input of power converter 300.

It should be noted that R2, R4, R8 and R9 are optional components, and may be omitted without limiting the usefulness of the exemplary circuit 100. A common voltage reference may be used (as in FIG. 3), or separate references (103, 105 in FIG. 2) may be used, without limiting the usefulness of the circuit. Current amplifier 102 may be designed to provide a fast response, or may be tailored to provide a slow response, neither of which limits the usefulness of the invention.

In accordance with the exemplary embodiment shown in FIG. 2, current feedback control circuit 100 operates in the following manner. Power converter 300 supplies an output voltage $V_o$ to load 201, causing a current $I_o$ to flow through load 201 in accordance with Ohm's law. Current sensor 101 monitors current flow $I_o$, and provides a proportional current sense signal VS to resistive network R7, R8. Illustratively, the resulting voltage at the junction of R7 and R8 is proportional to current sense signal Vs, and provides the non-inverting input to current amplifier 102. Voltage reference 103 is coupled via resistive network R6, R9 to the inverting input of current amplifier 102. Illustratively, R10 functions as a conventional operational amplifier feedback resistor for current amplifier 102, where the gain of current amplifier 102 is determined by the ratio of R10 to the parallel combination of R6 and R9. An RC network may be substituted for R10 to provide for current loop compensation to ensure stable operation between paralleled power supplies. The gain may be tailored to provide the desired response characteristic for a particular application.

The output signal level from current amplifier 102 is designated as $V_c$, and is illustratively coupled to the inverting input of error amplifier 104 via coupling circuit R5, CR1. Under normal conditions, output current $I_o$ is at full value (above the predetermined minimum) and current sense signal Vs is at a corresponding (high) level. Reference voltage 103 divider resistors may be set to a level where the differential voltage between the inverting and non-inverting inputs to current amplifier 102 results in a high level of output signal $V_c$. Illustratively, this high level of output signal $V_c$ causes diode CR1 to be reverse-biased, thus blocking signal level $V_c$ from affecting the voltage regulating feedback signal $V_f$ at the input to error amplifier 104.

Voltage regulating feedback signal $V_f$ is representative of the level of output voltage $V_o$, and, illustratively, provides a feedback input to the inverting input of error amplifier 104. Reference voltage 105 illustratively provides a baseline voltage level to the non-inverting input of error amplifier 104, such that the integrated differential voltage between the inverting and non-inverting inputs of error amplifier 104 results in an output error signal V. In this exemplary embodiment, output error signal $V_e$ responds inversely to the signal at the inverting input of error amplifier 104.

Feedback impedance $Z_i$, in conjunction with resistors R1 and R2, determines the gain characteristics of error amplifier 104. Illustratively, impedance $Z_i$ may be configured as a resistor in series with a capacitor, or in parallel with a capacitor, or a parallel combination of a capacitor and a resistor in series with a capacitor, to provide a high gain response for low frequency variations in output voltage $V_o$, and a low gain response for high frequency variations (i.e., transients).

Error signal $V_e$ is suitably coupled to the power converter 300, to maintain a nominally constant output voltage $V_o$ to load 201. However, operating variations due to temperature, aging, or other factors, can cause minor changes in the level of output voltage $V_o$. For paralleled power converter applications, to be described below in conjunction with the schematic diagram of FIG. 3, a decrease in the output voltage of one or more power converters in a paralleled arrangement can cause a significant current sharing imbalance, as previously described in the Background of the Invention section. Therefore, some type of forced current sharing technique is generally desirable for an efficient application of paralleled power converters.

The current control circuit 100, as shown in FIG. 2, is an exemplary embodiment of an apparatus and method which forces a predetermined minimum level of output current ($I_o$) for a power converter, in order to enhance its current sharing characteristics in a paralleled application.

For example, if output voltage $V_o$ decreases across load 201, load current $I_o$ decreases proportionately, causing current sense signal $V_s$ to decrease. At a predetermined minimum level set by the characteristics of current sensor 101 and the level of reference signal 103, current sense signal $V_s$ decreases sufficiently to cause current amplifier 102 to output a low signal level $V_c$. As a result, illustratively, diode CR1 becomes forward-biased, and low (pull down) signal $V_c$ is coupled to the inverting input of error amplifier 104, which causes an increase in output signal level $V_e$.

Illustratively, the increase in output signal level $V_c$ causes power converter 300 to adjust its output voltage $V_o$ higher, thereby increasing output load current $I_o$. The $dV_o/dI_o$, change in output voltage is illustratively determined by the gain of current amplifier 102, and the ratio of R5 to R1 and R2. In addition, R5 can be set to limit the range of adjustment of output voltage $V_o$ from power converter 300. A moderately high value of R5 (e.g., as compared to R1 and R2) will limit the steepness of the $dV_o/dI_o$ slope, while a much lower value of R5 (e.g., as compared to R1 and R2) will result in a much steeper slope.

Figure 3:
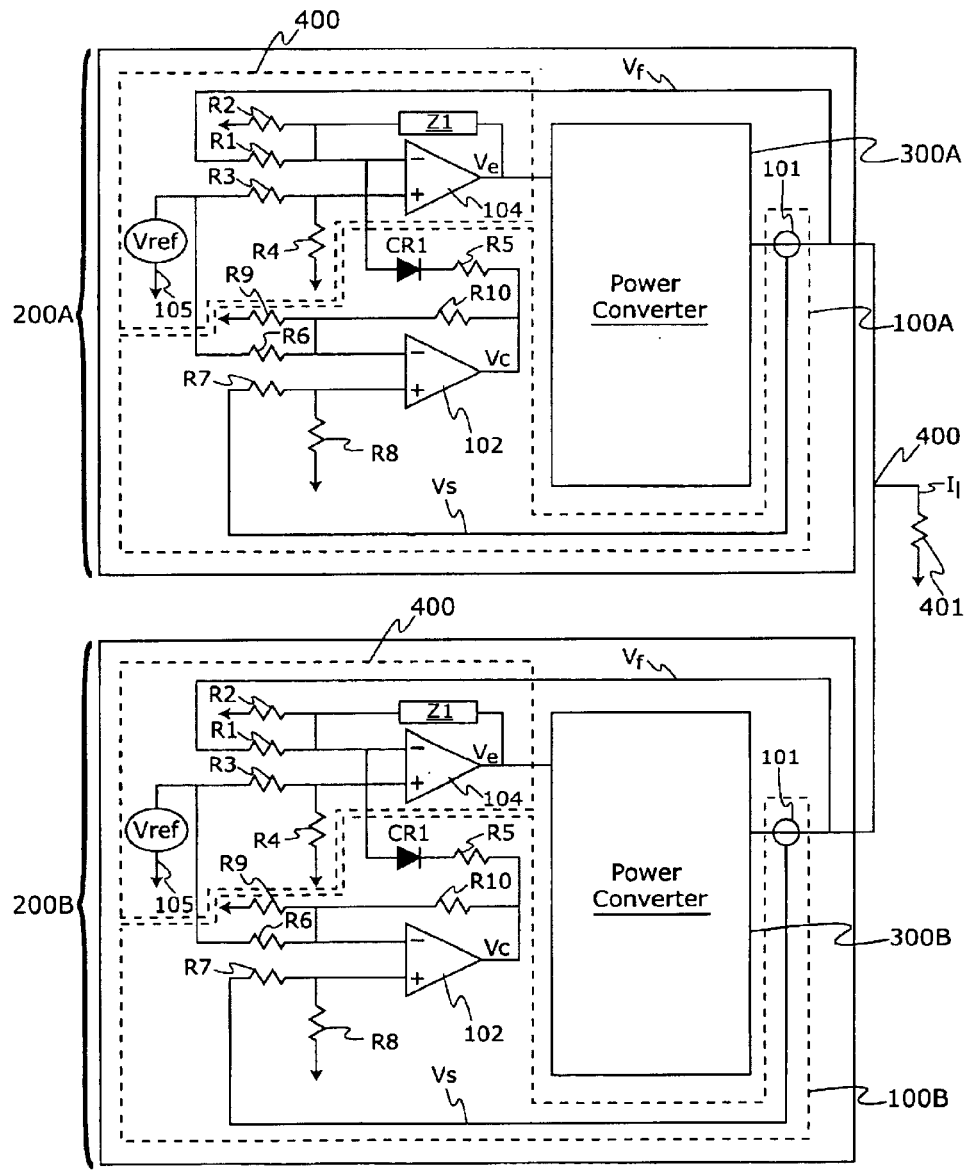
FIG. 3 schematically depicts an exemplary current balancing arrangement for paralleled power converters.

Referring now to FIG. 3, an exemplary arrangement of paralleled power supplies 200A, 200B is shown with respective independent current feedback control circuits 100A and 100B, each operating in the same manner as described above for the FIG. 2 configuration of power converter 100. The only common connection shown in FIG. 3 between the two power converters 300A, 300B is output connection 400 to load 401. In practice, a return connection is also provided, although not shown in FIG. 3 for clarity. While the exemplary embodiment shown in FIG. 3 includes two paralleled power converters, the regulating process disclosed herein may apply equally well to multiple paralleled power converters.

In accordance with this exemplary embodiment, if power converter 300A has a higher output voltage than power converter 300B, for example, power converter 300A will supply more of the load current I1, while power converter 300B supplies less. At a predetermined minimum level of output current from power converter 300, current control circuit 100B causes the output voltage of power converter 300B to increase at a predetermined rate ($dV_o/dI_o$ in FIG. 2), until it reaches the approximate level of the output voltage from power converter 300A. At this point, illustratively, power converter 300B supplies at least its predetermined minimum share of the total load current.

The current balancing technique, as described above, ensures that a predetermined minimum level of output current will be supplied by each of the power converters in a paralleled arrangement, due to the independent regulating action of their respective current control circuits. Moreover, each power converter operates in an active voltage regulation mode, with resulting low output impedance. An additional benefit results from the fact that load current transients can be shared by all the paralleled power converters, thus enhancing the transient response of the overall power system.

A further advantage of the various embodiments is operation in an effective current source mode. That is, the power converter may be caused to adjust its output voltage upwardly, to any preset limit, to enable control and regulation of the output current drawn from the power converter. The regulation loop may still control output voltage, and the power converter may still operate in output voltage regulation mode while the increasing output voltage forces regulation of output current. The power converter therefore functions, in effect, as a low output impedance current source.

In short, a current feedback control circuit for a power converter forces a predetermined minimum output current level from each power converter in a paralleled arrangement, where each paralleled power converter is independently regulated by its respective current control circuit. The current balancing arrangement only requires a common interconnection point between power converters at their load outputs, with no cross coupled interconnections between power converter control circuits. Active voltage regulation may be maintained under any conditions, in conjunction with low output impedance characteristics. System efficiency is enhanced due to the forced sharing of load responsibility among all the paralleled power converters.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A current control circuit configured to regulate a power source having an output connected to a load, the current control circuit comprising:
   a current sensing circuit configured to provide a current feedback signal as a function of a level of current flow from the output of the power source;
   a current amplifier having a first input configured to receive the current feedback signal, a second input configured to receive a reference voltage, and an output configured to provide a current amplifier output signal as a function of the difference between the current feedback signal and the reference voltage;
   a coupling circuit configured to receive the current amplifier output signal and to produce a coupling signal as a function of the current amplifier output signal to a voltage regulation error amplifier configured to receive the sum of the coupling signal and the feedback signal.

2. The current control circuit of claim 1 wherein the coupling circuit is further configured to sink current from the feedback signal when the output current of the power source is less than a predetermined current level.

3. The current control circuit of claim 1 wherein a decrease in the level of current flow at the output of the power source below a predetermined minimum threshold causes the current control circuit to produce an increase in the output voltage of the power source, thereby causing an increase in the output current to the load.

4. The current control circuit of claim 1 wherein the range of adjustment of the power source output voltage is limited by the resistance of the coupling circuit.

5. The current control circuit of claim 1 wherein the predetermined minimum threshold is determined by the characteristics of the current sensing circuit and the current amplifier reference voltage.

6. The current control circuit of claim 1 wherein the power source is configured as a low output impedance voltage source.

7. The current control circuit of claim 1 wherein the parameters of the current amplifier and the coupling circuit determine the response characteristics of the current control circuit.

8. The current control circuit of claim 1 wherein the sensing circuit comprises one or more resistors.

9. The current control circuit of claim 1 wherein the sensing circuit comprises Hall effect devices.

10. The current control circuit of claim 1 wherein the sensing circuit comprises a current transformer/sense resistor.

11. A current balancing circuit for paralleled power converters, where the outputs of the paralleled power converters are commonly connected to a load, comprising:
    a first current control circuit connected to a first paralleled power converter, the first current control circuit comprising;

a current sensing circuit configured to provide a current feedback signal as a function of a level of current flow from the output of the power converter;

a current amplifier having a first input configured to receive the current feedback signal, a second input configured to receive a reference voltage, and an output configured to provide a current amplifier output signal as a function of the difference between the current feedback signal and the reference voltage;

a coupling circuit configured to receive the current amplifier output signal and to produce a coupling signal as a function of the current amplifier output signal to a voltage regulation error amplifier configured to receive the sum of the coupling signal and the feedback signal; and a second current control circuit connected to a second paralleled power converter comprising like elements cooperating in the same manner as in the first current control circuit.

12. The current balancing circuit of claim 11 wherein a decrease in the level of current flow at the output of the first paralleled power converter below a predetermined minimum threshold causes the first current control circuit to produce an increase in the output voltage of the first paralleled power converter, resulting in an increase in the output current of the first paralleled power converter to the commonly connected load.

13. The current balancing circuit of claim 11 wherein a decrease in the level of current flow at the output of the second paralleled power converter below a predetermined minimum threshold causes the second current control circuit to effect an increase in the output voltage of the second paralleled power converter, resulting in an increase in the output current of the second paralleled power converter to the commonly connected load.

14. The current balancing circuit of claim 11 wherein the range of output voltage adjustment of the commonly connected paralleled power converters is limited by the respective coupling circuit resistances in the first and second current control circuits.

15. The current balancing circuit of claim 11 wherein the paralleled power converters comprise a low output impedance voltage source.

16. The current balancing circuit of claim 11 wherein the parameters of the current amplifiers and the coupling circuits in the first and second current control circuits determine the response characteristics of their respective current control circuits.

17. A method of controlling the output current of a voltage regulated power converter, comprising the steps of:

a) sensing the output current of the voltage regulated power converter;

b) comparing the sensed output current to a predetermined minimum current threshold;

c) regulating the voltage regulated power converter to maintain an output current level above the predetermined minimum threshold, wherein the regulating step comprises summing a signal related to the sensed output current with a feedback signal related to the output voltage of the power converter.

18. A voltage regulated power converter circuit comprising:

a voltage regulated power converter;

a sensing circuit;

a comparing circuit; and a regulating circuit;

wherein the voltage regulated power converter circuit is configured to compare the converter output current to a predetermined threshold level, and to maintain the output current above the predetermined threshold level, and wherein the regulating circuit is configured to receive the sum of a signal related to the converter output current and a feedback signal related to the converter output voltage.

19. A method of sharing load current between paralleled voltage regulated power converters, comprising the steps of:

a) independently sensing the output current of each paralleled voltage regulated power converter;

b) independently comparing each sensed output current to a predetermined minimum current threshold;

c) regulating each paralleled voltage regulated power converter independently to maintain an output current above the predetermined minimum threshold, wherein the regulating step for each paralleled voltage regulated power converter comprises summing a signal related to the sensed output current with a feedback signal related to the output voltage of the power converter.

20. A system of multiple voltage regulated power converters providing current to a load, comprising:

a plurality of voltage regulated power converters commonly connected in parallel to the load, each one of the plurality of voltage regulated power converters having an independent current control circuit; wherein each independent current control circuit is configured to:
sense the output current of its respective voltage regulated power converter;
compare the sensed output current to a predetermined minimum threshold level; and
raise the output voltage of its respective voltage regulated power converter to maintain an output current above the predetermined minimum threshold, wherein raising, the output voltage comprises summing a signal related to the sensed output current with a feedback signal related to the output voltage of the power converter.

* * * * *